(12) United States Patent
Lepavec et al.

(10) Patent No.: US 11,099,764 B2
(45) Date of Patent: Aug. 24, 2021

(54) METHOD FOR AMENDING THE FIRMWARE OF A RESOURCE CONSTRAINED DEVICE

(71) Applicant: THALES DIS FRANCE SA, Meudon (FR)

(72) Inventors: Emmanuel Lepavec, Gemenos (FR); Dominique Bouveron, Gemenos (FR); Xavier Minette De Saint Martin, Gemenos (FR); Nicolas Vienne, Gemenos (FR); Guillaume Chi-Dan Phan, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 0 days.

(21) Appl. No.: 16/646,629

(22) PCT Filed: Sep. 10, 2018

(86) PCT No.: PCT/EP2018/074307
§ 371 (c)(1),
(2) Date: Mar. 12, 2020

(87) PCT Pub. No.: WO2019/052944
PCT Pub. Date: Mar. 21, 2019

(65) Prior Publication Data
US 2020/0293215 A1    Sep. 17, 2020

(30) Foreign Application Priority Data
Sep. 13, 2017    (EP) ..................... 17306183

(51) Int. Cl.
*G06F 3/06* (2006.01)
*G06F 8/654* (2018.01)

(52) U.S. Cl.
CPC .......... *G06F 3/0647* (2013.01); *G06F 3/0607* (2013.01); *G06F 3/0622* (2013.01);
(Continued)

(58) Field of Classification Search
CPC .... G06F 3/0607; G06F 3/0622; G06F 3/0632; G06F 3/0647; G06F 3/0673; G06F 8/654
See application file for complete search history.

(56) References Cited

U.S. PATENT DOCUMENTS

2015/0193222 A1    7/2015    Pirzadeh et al.
2015/0355900 A1    12/2015   Crosby et al.

OTHER PUBLICATIONS

International Search Report (PCT/ISA/210) and Written Opinion (PCT/ISA/237) dated Dec. 3, 2018, by the European Patent Office as the International Searching Authority for International Application No. PCT/EP2018/074307.

*Primary Examiner* — Yong J Choe
(74) *Attorney, Agent, or Firm* — Buchanan Ingersoll & Rooney PC

(57) ABSTRACT

The present invention relates to a method for amending the firmware of a device with limited resources, the device comprises a memory unit, and a firmware amending software, and the firmware comprises:
at least two functional components, wherein the first functional component comprises at least one public function, configured to be called by at least one second functional component different from the first functional component,
a functional component table, wherein at least one of the functional components is registered,
a call dispatch unit, where each call addressing one of the public functions is dispatched,
wherein the firmware amendment comprises the steps for the firmware amending software of:
(Continued)

storing a new functional component at a memory location of the memory unit,
updating the functional component table with the memory location of said new functional component, and
handing over control to the firmware.

12 Claims, 4 Drawing Sheets

(52) U.S. Cl.
CPC .......... *G06F 3/0632* (2013.01); *G06F 3/0673* (2013.01); *G06F 8/654* (2018.02)

METHOD FOR AMENDING THE FIRMWARE OF A RESOURCE CONSTRAINED DEVICE

FIELD OF THE INVENTION

The present invention relates to a method for amending the firmware of a resource constrained device.

The invention also pertains to a device using said method.

BACKGROUND OF THE INVENTION

Generally, in the field of embedded operation of systems, like in relation with embedded chip cards, it is known that the operating software, in particular the firmware of such embedded systems is hard to be amended. This is due to the resource constraint that does not allow storing two parallel installations of firmware which are exchanged as part of an upgrade procedure.

In particular in the context of security based systems, like secure integrated chip cards for banking, telecommunication subscription handling or secure elements, this is disadvantageous as any type of updates, including security updates or functional additions, could in the worst case not be carried out. This would compromise the whole system.

On the other hand there is no way of increasing the resource for the envisaged devices, mainly due to cost reasons. The availability of at least double of the needed permanent memory for storing firmware just for the sake of a potential update is hardly marketable.

It is therefore the goal of present invention to overcome the mentioned disadvantages and to propose a solution for an improved firmware amendment for resource constrained devices, in particular integrated chip cards.

Further alternative and advantageous solutions would, accordingly, be desirable in the art.

SUMMARY OF THE INVENTION

For this it is according to a first aspect of the invention suggested a method or amending the firmware of a device with limited resources according to claim 1. It is further suggested according to a second aspect of the invention a device with limited resources according to claim 8.

According to the first aspect of the invention it is suggest a method for amending the firmware of a device, the device comprises a memory unit, and a firmware amending software, and the firmware comprises:

at least two functional components, wherein the first functional component comprises at least one public function, configured to be called by at least one second functional component different from the first functional component, a call dispatch unit, where each call addressing one of the public functions is dispatched, further the device comprises in the memory unit a functional component table, wherein at least one of the functional components is registered, and the device comprises a set of access rights governing access to said at least one public function, wherein the firmware amendment comprises the steps for the firmware amending software of:

storing a new functional component at a memory location of the memory unit, updating the functional component table with the memory location of said new functional component, and handing over control to the firmware, wherein a call of the at least one public function of the first functional component comprises for the second functional component executing a call of the call dispatch unit, wherein the call to the call dispatch unit includes a target indication relative to the first functional component and the public function to be called, and wherein the calling of the at least one public function comprises for the call dispatch unit the step of calling the public function indicated by the target indication by retrieving the memory location of the first functional component from the functional component table, and wherein the calling of the at least one public function comprises for the call dispatch unit the step of checking the set of access rights for the second functional component before calling the indicated public function of the first functional component.

According to the inventive method the device is equipped with a memory unit and a firmware. The firmware is a software resp. software bundle that controls the functions of the device. It is operated on a processing circuit of the device. The device is in particular provided with limited resources, preferably with regards to at least one of memory space in the memory unit and processing capacity in the processing circuit. Additionally the memory unit relates to at least one of volatile and permanent memory. Preferably the device comprises both volatile and permanent memory.

In the context of a security related device, like an integrated circuit card or banking card the access to all memory units of the device is typically secured, and only accessible for authorized use.

With the limitation in memory it becomes clear that any amendment of the firmware, in particular an update procedure, needs to be carried out by using the utmost minimum on memory resources. For making that possible, the inventive method suggests to compose the firmware in a way, that eases later updates to the firmware.

For doing so the firmware comprises at least two functional components. Such functional components preferably encapsulate certain functional blocks that are preferably handled together and at one place. Such functional blocks typically cover input/output (I/O) operations, memory management, cryptographic tasks, event handling etc. In the context of modular programming this approach is well known and belongs to the craftsmanship of each programmer. In what sense a functional component complements e.g. to a class, an object or a package is up to the individual firmware design to decide.

Such functional components preferably comprise at least one public function. Such public function is a routine, like a function, method or other executable element of the functional component which is designed to be called from other functional components. With that an interaction between different functional components is possible, e.g. when a functional component for I/O-operations requires security related features like cryptographic functions from the respective security functional component.

Preferably the firmware comprises a core component. Such core component may constitute another functional component. In that sense it may be updateable like each other functional component according to the present invention.

The core component is in particular designed to handling central operational tasks of the firmware, either in conjunction or independent of other functional components.

Additionally the firmware comprises, preferably stored in the memory unit, a functional component table. In this functional component table at least one, preferably the majority of functional components is registered. Such registration is preferably done by a reference in the functional component table for each functional component and a memory location where to find the functional component, further giving an indication where to call the at least one public function of the functional component. This is preferably done with a memory address for the functional component and an offset for each public function, relative to the address of the functional component itself.

With the call dispatch unit the firmware comprises a special component, that handles the cross functional component calls. Preferably the call dispatch unit is part of the core component. The call dispatch unit is configured to carry out the call to the public functions of an addressed functional component launched by a second functional component.

This is advantageously done by a method step wherein a call of the at least one public function of the first functional component comprises for the second functional component executing a call of the call dispatch unit, wherein the call to the call dispatch unit includes a target indication relative to the first functional component and the public function to be called, and wherein the calling of the at least one public function comprises for the call dispatch unit the step of calling the public function indicated by the target indication by retrieving the memory location of the first functional component from the functional component table.

With this step the calling functional component calls the call dispatch unit at least with a target indication which relates to the addressed functional component. Such target indication is preferably one of a registration reference, a token or a qualified name of the targeted functional component. Additionally a vector of arguments is preferably provided with each call.

The call dispatch unit then checks with the target indication if in the functional component table a matching functional component is found. If so, the memory location of the identified functional component is retrieved from the functional component table. Otherwise an exception handling is carried out.

Based on the memory location the call dispatch unit then has all means available to effectively carry out the call to a public function of the functional component.

The firmware organized like described allows carrying out the firmware amendment by the following steps. These steps are carried out by the firmware amending software, which is preferably a software component separate from the firmware. It may be called directly by the firmware, it may alternatively called by a bootloader, whenever a firmware amendment operation is supposed to be carried out.

The firmware amendment is conducted on functional component basis. E.g. if a new functionality needs to be added, a complete new functional component is added. If a functionality is to be removed, a complete functional component is supposed to be removed. If a functionality is to be adapted, then at least one complete functional component is replaced by another functional component. In the latter case preferably the public functions of the previous release of the functional component are supported again.

Hence, first the new functional component needs to be made available to the device via external interfaces of the device. Such is preferably a hardware-port like, USB, I2C etc. or a wireless port like NFC, etc., all in accordance with the respective furnishing of the device. When the new functional component is made available it is stored in the memory unit. Additionally the firmware amending software conducts an update of the functional component table with the memory location of the new functional component.

When the new functional component comprises adding functionality, the amendment operation is done with these steps.

In case of an update of an already existing functional component it is suggested according to a preferred embodiment the steps of substituting one of the functional components with new functional component by replacing the registration of the substituted functional component in the functional component table.

According to this embodiment the update of an existing functional component is carried out after loading the new functional component into the memory, and that the registration of the functional component which is to be replaced is substituted by the registration of the new loaded functional component. Both functional components have the same target indication, like said qualified name. The firmware amending software has to make sure that after completion of the firmware amendment no two registration entries are found in the functional component table that provide the same target indication. For doing so the firmware amending software either overwrites the previous registration record with the new registration data relating to the new functional component, or adds a new record and then removes the previous record in the functional component table.

Advantageously the new loaded functional component is copied at the place in the memory unit of the previous functional component. This option saves memory space. Then a change of the registration record in the functional component table can possibly even be omitted. This option requires that the new loaded functional component fits into the same memory space as used for the substituted functional component.

Preferably the firmware amending software first checks if the used memory space is sufficient for replacing, and if not copies the loaded functional component to another location in the memory unit. Preferably the memory space for the substituted functional component is consequently marked so that it can be overwritten for other firmware amendments of other functional components.

In case of removing a functional component it is sufficient to remove the registration record in the functional component table for the respective functional component. Preferably this is also carried out by the firmware amending software. Additionally also in this case the memory space used by the removed functional component is preferably marked for overwriting.

It is foreseen in the inventive method that a firmware amendment operation comprises a plurality of singular updating, adding, or removal operations. The firmware amending software is configured to carry out each of the steps. The complete firmware amendment then is started by retrieving at the firmware amending software an indication which functional components will be replaced, which will be added and which will be removed. The firmware amending software preferably has an algorithm for an optimized handling of such amendment operation, e.g. by first carrying out removing, then replacing, then adding of functional components. Alternatively the firmware amending software is instructed by the update package in which order to carry out the amendment operations.

According to the invention the device further comprises a set of access rights governing access to said at least one public function, and that calling of the at least one public function comprises for the call dispatch unit the step of checking the set of access rights for the second functional component before calling the indicated public function of the first functional component.

This step enhances the interface table by an authorization mechanism for calling public functions. This improves the security of the firmware as the access to certain sensible public functions may be restricted to a defined group of callers.

Preferably the access rights assign call rights for selected public function for a given set of functional components.

Access rights further comprise other types of security configuration, in particular memory protection resp. memory management, with that the access to memory blocks for certain actors is further governed. With a generally prohibited access to certain memory areas access rights are preferably designed to temporarily allow in—particular in conjunction with public function calls—such access.

Additionally the functional components may be clustered to packages or groups, and consequently the access rights are then assigned to such packages or groups, and are inherited by each functional component belonging to such packages or groups.

The call dispatch unit consequently has not only the task to check, if a targeted public function is existing, but also if the calling functional component has the rights to do so. This increases security and integrity of the firmware.

The inventive approach is promising for devices with limited resources, in particular relating to memory, as a minimum of additional memory than used for the firmware is needed. In extreme cases the approach even allows to carry out firmware amendments without any additional memory. This is the case when only replacing operations are carried out where the functional components are replacing previous functional components, without an extension in terms of memory requirements.

After the necessary steps for each of the operations is carried out, the firmware amending software hands over the control to the firmware.

According to another preferred embodiment further the first functional component comprises an interface table listing the at least one public function, and wherein the calling of the at least one public function comprises for the call dispatch unit the step of calling the public function indicated in the target indication provided it is listed in the interface table.

This embodiment suggests that the functional component has means to instruct the call dispatch unit about what public functions are available for being called from other functional components.

Such means is the interface table that lists the at least one public function of the respective functional component. Typically more than one public function is available, and the interface table also has a call reference for each requested public function. Further mandatory parameter lists are advantageously part of the interface table.

By that the call dispatch unit is put into the position after getting a call request from another functional component to check if an addressed public function of the targeted functional component is indeed available. If not, then an exception handling is executed. The same applies if the interface is not correctly matched, e.g. the parameter list does not match between call and interface table.

Preferably the functional component comprises a generic public function that is set to deliver the interface table to the caller, that is the call dispatch unit. It is further preferred that the call dispatch unit has a function callable by other functional components investigating for the interface table of another functional component identified by the target indication.

Such interface table is advantageous as it allows the call dispatch unit to smoothly catch erroneous calls to public functions of functional components that do not exist. Further it allows dynamic programming on the side of the functional components. As such it could be selected based on availability an encryption function from the encryption functional component.

Preferably the interface table is stored with the functional component in coded form, in order to prevent manipulations.

According to another preferred embodiment further at least one functional component comprises an initialization function for preparing execution of the at least one public function of the functional component, wherein upon execution of the firmware the initialization function of the functional component is called.

This embodiment relates to the starting phase of the firmware. This may relate to any boot of the firmware. In particular it relates to the phase after getting handed over control by the firmware amending software as part of the firmware update process. A functional component is equipped with one initialization function. After startup for each functional component listed in the functional component table, the initialization function is called. This is preferably carried out by said core component resp. the call dispatch unit.

For the case that not each functional component provides such an initialization function, the functional component preferably indicates by the interface table if it provides an initialization function. The core component then checks the interface table of the functional component table if the initialization function exists, and if so calls it. Preferably the initialization function has a predetermined name, resp. a generic name.

Advantageously the initialization function of a functional component carries out tasks that are only to be done once, in particular right after the update operation is done. For later starts of the firmware for some functional components resource allocations or initializations, e.g. for RAM, may be carried out. For other functional components no further operation may then be executed by the initialization function for such later starts.

According to a preferred embodiment the initialization function comprises at least one out of the steps of
allocating of memory for the respective functional component,
instructing the call dispatch unit relating to at least one out of a public function and/or access rights to said public function after an amendment procedure,
migrating permanent data of substituted functional component to the called functional component.

The mentioned operations represent important tasks that are in particular necessary to be conducted right after the firmware amendment procedure has been carried out. The migration of permanently stored data from the substituted functional component is in particular necessary, when a change of data storage format is part of the update of the respective functional component. Then a conversion of the originally stored data to the data format expected from the updates functional component needs to be carried out as part of the initialization function. For that operation it is also needed a permanent memory allocation.

Regularly executed operations that are carried out for each call of the firmware comprise in particular allocations of volatile memory, further opening of communication channels etc.

For the call dispatch unit it is in particular foreseen to allow the initialization function to instruct the call dispatch unit with any new/updated/relevant information concerning the functional component.

According to the second aspect of the invention it is proposed a device comprising processing circuitry, a memory unit, stored in the memory unit at least a firmware, and a firmware amending software, wherein the firmware comprises:

at least two functional components, wherein the first functional component comprises at least one public function, configured to be called by at least one second functional component different from the first functional component, a call dispatch unit, where each call addressing one of the public functions is dispatched, further the device comprises stored in the memory unit a functional component table, wherein at least one of the functional components is registered, wherein for amending the firmware the firmware amending software is configured to:

store a new functional component at a memory location of the memory unit, update the functional component table with the memory location of said new functional component, and hand over control to the firmware.

The device according to this aspect of the invention is preferably resource constrained. This in particular encompasses that the firmware update or at least major parts of are not storable in the device besides an firmware update, so that simple a replacement of firmware could be carried out.

It provides processing circuitry for processing the firmware software. Further it comprises a memory unit, in particular permanent and volatile memory and the firmware. The firmware is stored in the memory unit. When executing parts of the firmware are loaded into volatile memory and executed.

The firmware amending software may be part of a separate device connected to said device.

This aspect of the invention shares the advantages of the first aspect of the invention.

As it is shown this invention advantageously solves the depicted problem and offers an architecture which eases updating of the firmware with limited resources. Moreover the firmware architecture allows a secure way of operating. Insofar the inventive approach introduces twofold improvements compares to the known solutions in the art.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows a device 1 of the type to which the present invention is applied to as an embodiment. This device comprises a processing circuitry 15 and a memory unit 2. More other circuitry and interfaces are preferably foreseen but omitted in this example for simplicity reasons.

Figure 1:
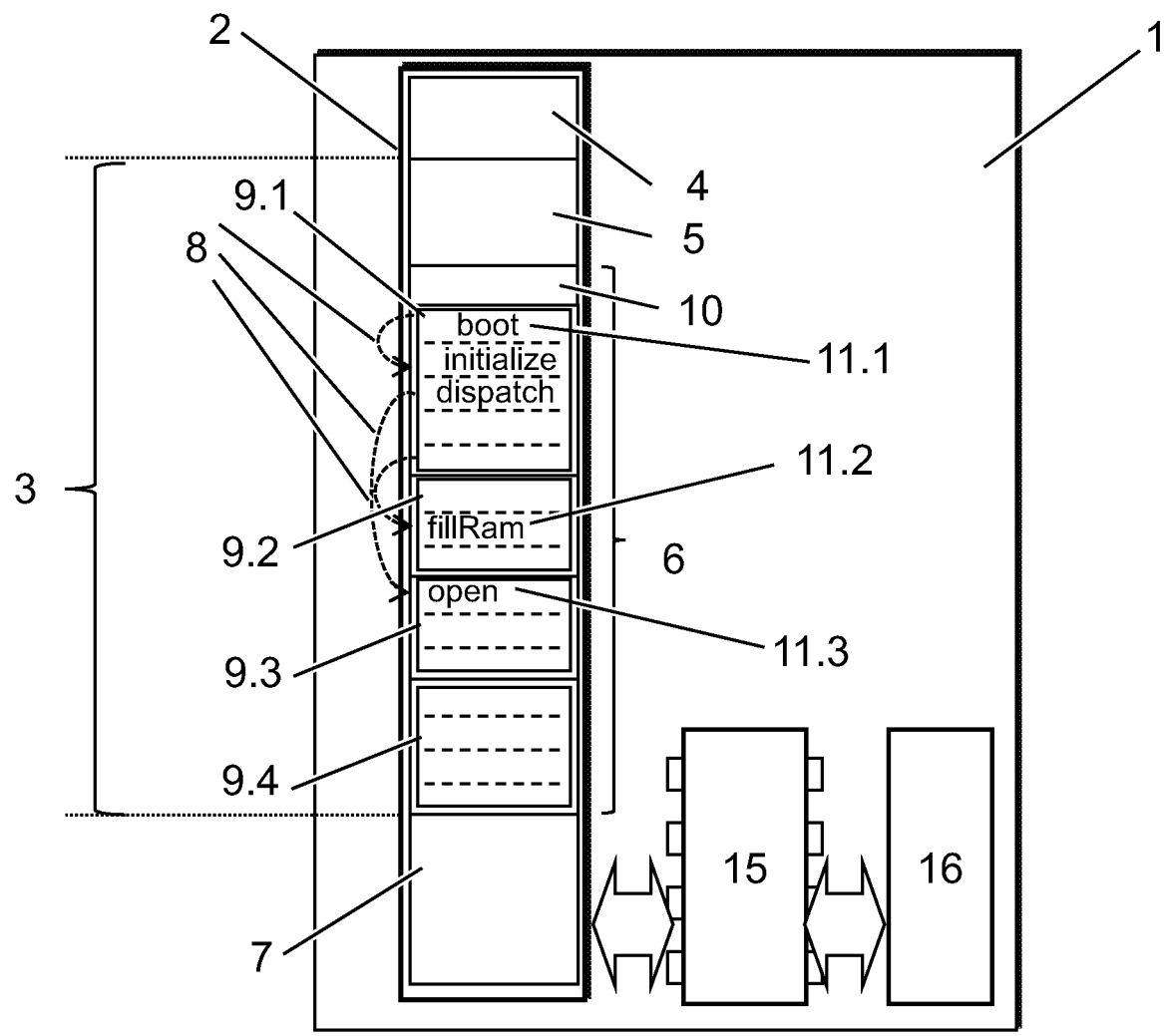
FIG. 1 represents a device of the type to which the present invention is applied as an embodiment.

The processing circuitry 15 is configured to execute software stored in the memory unit, in particular the firmware 3. For that the respective part of the firmware is loaded into volatile memory 16. Which part of the firmware is at a given time loaded in the volatile memory 16 is solved by paging algorithms. The firmware 3 as stored in the memory unit 2 is composed that way that it can be amended by update packages that are loaded through interfaces not shown in the figure. Preferably such an interface is a wired interface like USB, or—in case of a device of the type of a UICC—the USIM interface.

For successfully carrying out the firmware amendment procedure it is mandatory according to present invention that the memory unit 2 is organised in a special way. As such the memory unit comprises the firmware 3, a firmware amending software 4 and a data section 7. The firmware amending software 4 is in an advantageous embodiment of the invention a separate executable stored in the memory unit. It could also be part of the firmware. On the other hand it is also possible to store the firmware amending software in a separate memory unit like a ROM or a separate device connected to said device.

The firmware 3 however has a special structure as shown in this example. As entry point of running the firmware is typically foreseen the core component. In one exemplifying embodiment the core component of the firmware comprises the call dispatch unit 5. Alternatively, and shown here, the core component is the first functional component 9.

The call dispatch unit has the task to call public functions 11 (shown as 11.1, 11.2, 11.3) of functional components 9 (shown as 9.1, 9.2, 9.3) of the firmware. Hence when starting the firmware first a function of the call dispatch unit 5 is started by the device and then calls the public function 11.1 of the core component which is dedicated for booting the firmware. The start is preferably carried out by a bootloader, or directly as first entry point from BIOS or the like. As it can be seen the firmware comprises a couple of functional components 9. The functions of the functional components are designed to call public functions 11 of other functional components, as indicated by the function calls 8.

For being able to call public functions of functional components the call dispatch unit 5 needs to be instructed about the availability of such functional components and its public functions. For that the functional component table 10 is additionally placed in the memory unit 2. The call dispatch unit 5 has read access to this functional component table.

As it is shown, the firmware provides a modular approach, which means the firmware is composed of exchangeable software modules, called functional components. With the functional component table it is maintained which functional components with which callable functions are available. This allows a maximum of flexibility.

Figure 2:
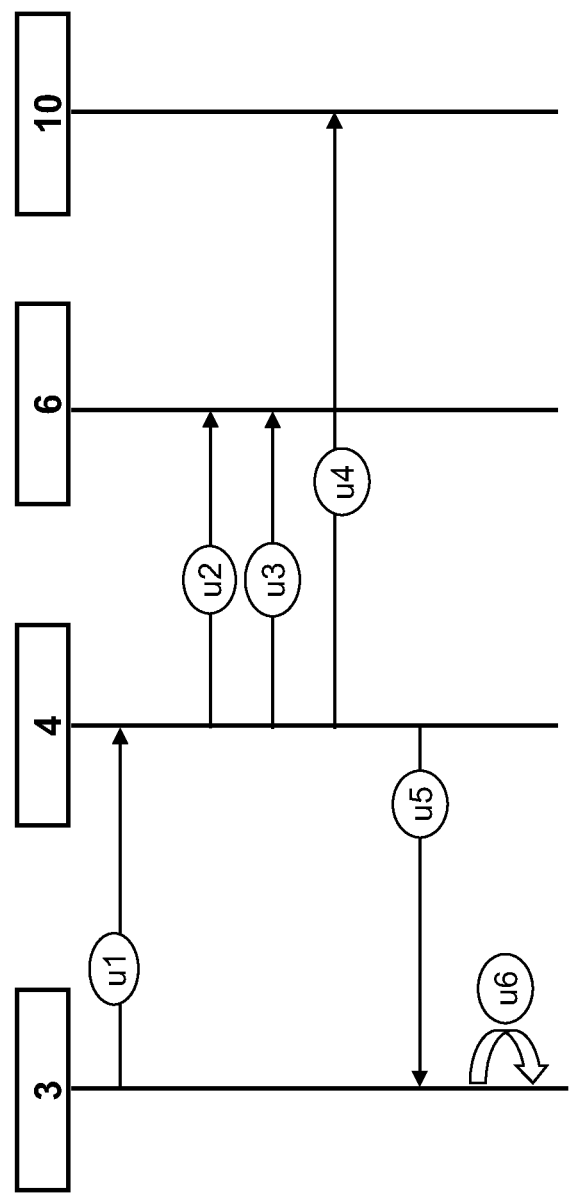
FIG. 2 shows a sequence diagram illustrating an exemplifying embodiment of the firmware amendment according to the invention.

FIG. 2 shows, how this flexibility of the firmware layout is used for amending the firmware. When the firmware 3 of device 1 is noticed about a pending firmware amendment, it hands over with message u1 the control to the firmware amending software 4. The firmware amending software is the software that preferably independent of the firmware 3 handles all required steps for making the pending firmware amendment. Alternatively the firmware amending software 4 is started after a reboot of the device, where the bootloader is instructed to call the firmware amending software 4 instead of the firmware 3.

Independent of the way how to call the firmware amending software 4, it then carries out the following steps. Preferably the firmware update comprises a plurality of operations on functional components 9. Such operations are adding, updating or removing functional components.

According to the shown example the firmware amendment comprises a functional component update. Due to the limited amount of memory the firmware amending software prepares the functional component storage 6 being part of the memory unit 2 by erasing the functional component that is about to be updated with operation u2.

Then the firmware amending software 4 has the task to carry out operation u3 for loading at least one functional component into the functional component storage. Such operation may comprise both loading of the replacing functional component for the just erased functional component, and new functional components, that need to be placed in a free area of the functional component storage. Should no such free area be available, then the firmware amendment would be needed to be terminated with an exception. It is preferred to check if sufficient memory is available before executing any operation on the firmware 3.

When all new functional components 9.1, 9.2 are placed in the functional component storage 6, then the firmware amending software finalizes the operation by updating the functional component table 10. The functional component table 10 consists at least of records for each functional component stored in the functional component storage. For each functional component at least a target indication is stored and a memory location 14 of the functional component.

Therefore with the message u4 the firmware amending software updates the functional component table according to the previously executed firmware amendment operations. This step in particular comprises adding and removing of functional components in the functional component table. Only if an update of a functional component leads to a change of the record of the functional component table, also for this step an update is carried out on the functional component table.

This step finished the firmware amendment operation, and consequently the firmware amending software terminates its work and hands over with operation u5 the control to the firmware. As such the now amended firmware can carry on with a restart operation u6 before entering its normal operations. As part of the restart operation the firmware preferably after being amended is conducting initialization operation like when it is started anew after powering on. Preferably this is achieved by a reset/restart of the firmware.

Figure 3:
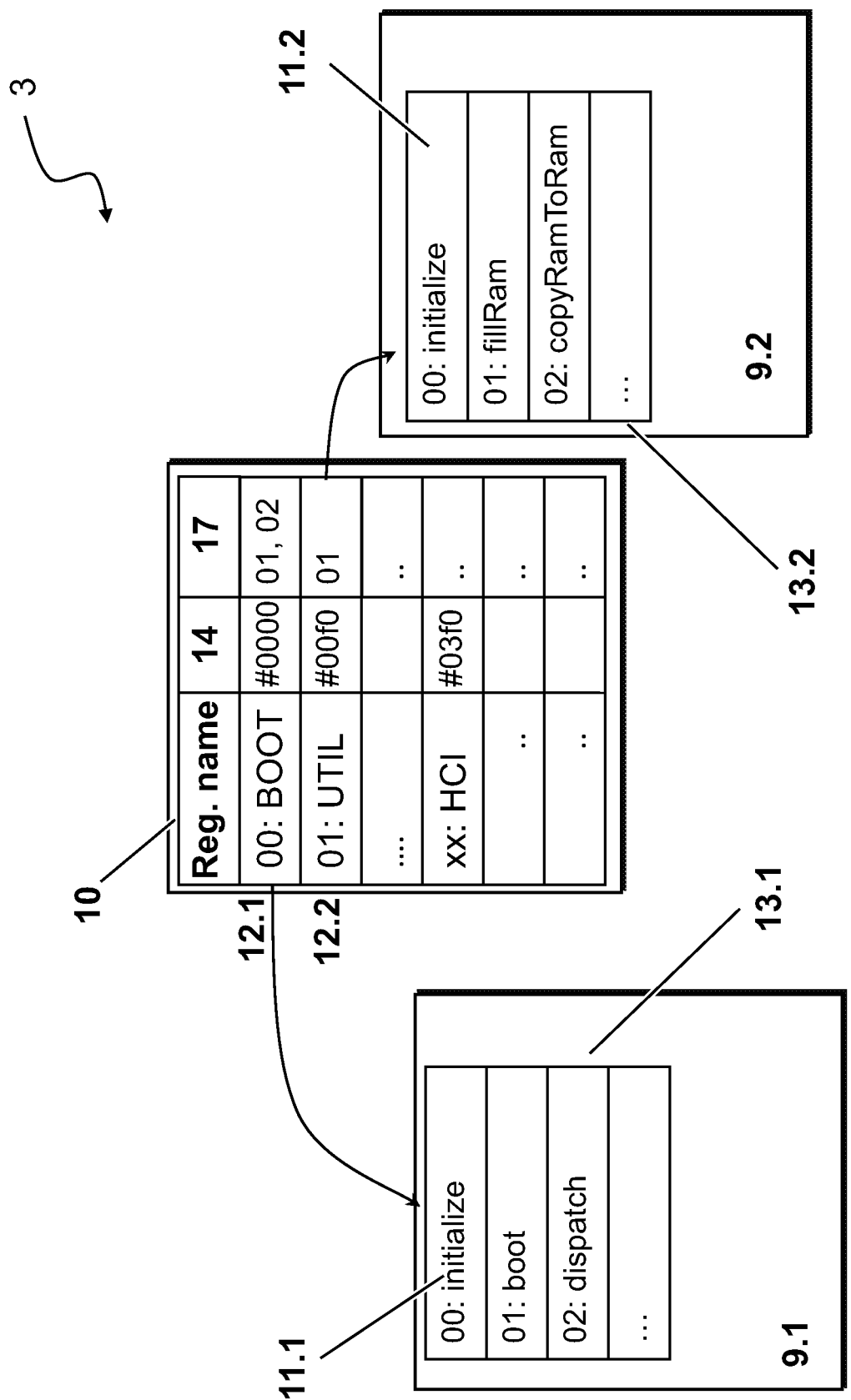
FIG. 3 Shows the memory structure of the firmware of a device of the type to which present invention is applied.

For being amendable the way as it is described the firmware is composed of functional components, which shows a modular approach of the firmware. How such a structure looks like in detail is shown in an exemplifying manner in FIG. 3. Here it is shown two functional components 9.1, 9.2 of the firmware 3. More functional components could indeed exist, but for illustration purposes only the two shown functional components are discussed.

Additionally it is shown the functional component table 10. The functional component table holds records 12.1, 12.2 for each functional component of the firmware 3. In this case this is the record 12.1 indicating to functional component 9.1, by a registration name (column Reg. name) "boot", and a registration number "01", and record 12.2, indicating to functional component 9.2, with registration number "02" and registration name "UTIL". Preferably the firmware 3 is constructed that way that the functional component with a specific registration number, like "00", is the one that is called after starting the firmware, e.g. after powering the device.

The functional component table provides in each record besides the registration information a memory location 14. That is the place where the referred functional component is stored. Such memory location may comprise an address, storage place in the memory unit, an offset compared to a reference address or something similar.

This memory location 14 depicts the functional component. The structure of the functional components 9.1, 9.2 as shown in this example additionally provides each an interface table 13.1, 13.2. With this interface table it is indicated to the call dispatch unit, which public functions 11 are available for being called. In this example for functional component 9.1 the interface table 13.1 has a couple of public functions, e.g. public function 11.1 called "initialize". Additionally the functional component table has stored access rights 17 for each record 12.1, 12.2. In this case it is depicted by references for the public functions. Alternatively the access rights are defined by calling functional component. In this case another structure of functional component table plus access rights is proposed, in particular with the access rights information stored in at least one separate table.

Figure 4:
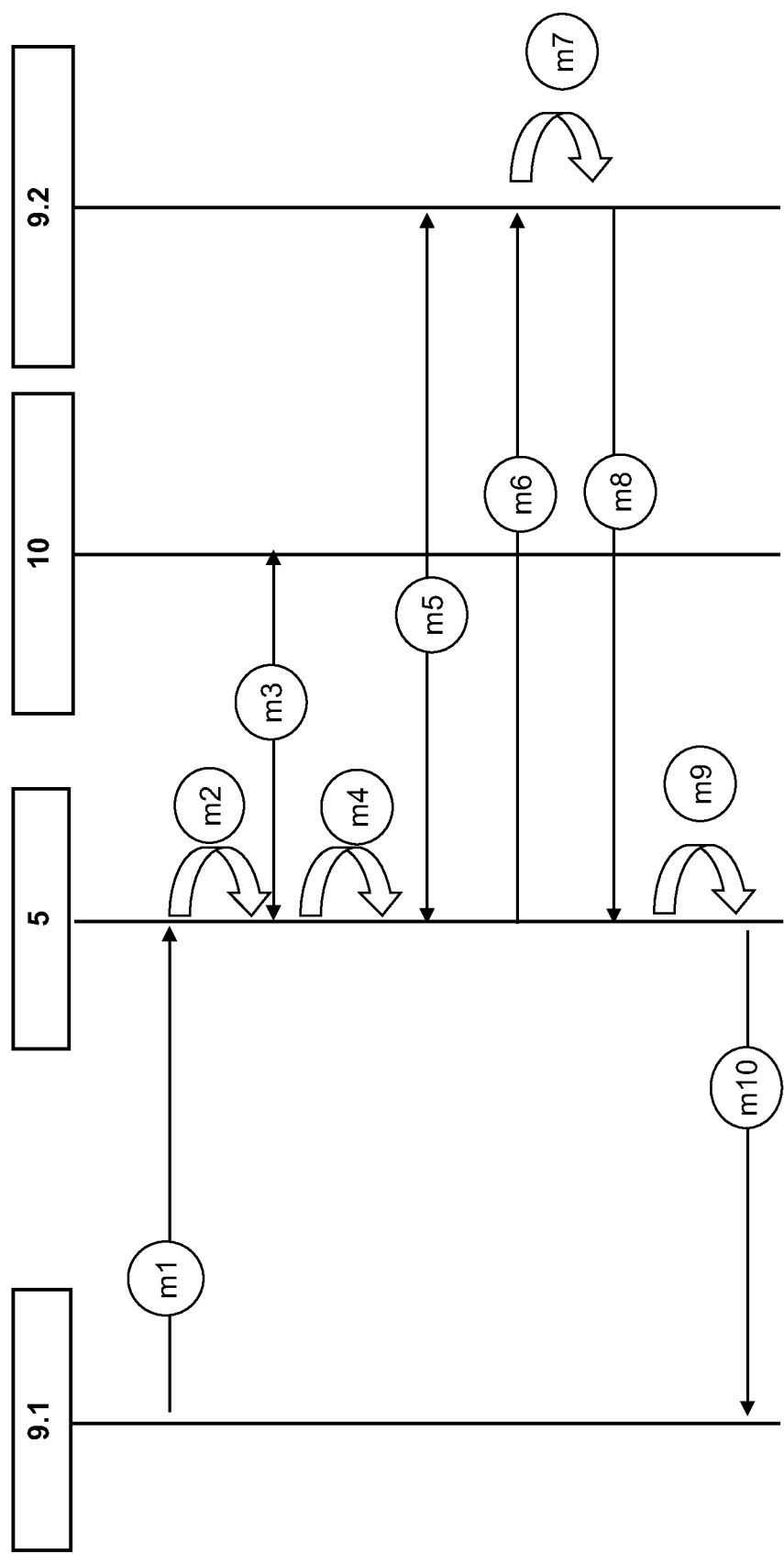
FIG. 4 Shows in another sequence diagram an exemplifying call flow of the firmware which allows a firmware amendment according to the invention.

Based on the shown structure the call for a public function of a functional component of the firmware is shown in a sequence diagram in FIG. 4.

The shown functional call refers to a call from a function of functional component 9.1 to a public function of functional component 9.2.

The procedure starts with a call message m1 from the functional component to the call dispatch unit 5. Preferably the call dispatch unit is part of a core component of the firmware. Alternatively the called function of the call dispatch unit is a static method available at each functional component according to the Singleton design pattern.

The call comprises all necessary parameter for addressing the target public function of the addressed functional component, and the parameter list.

Such a call could look like:

modCall(ip_uTIL, ID_UTIL_copyRamToRam, dest, src, len);

modCall is the (static) call function of the call dispatch unit 5.

ID_UTIL is the target indication for the called functional component 9.2. ID_UTIL_copyRamToRam is the public function name of functional component 9.2 which is supposed to be called.

With dest, src and len the arguments of the call are supplied. Here also a vector of key/value pairs could be provided.

Both target indications may consist of defined references or qualified names. In an advantageous embodiment the coding of public function calls between functional components is established by preprocessing, which transposes regular shaped functional calls to the syntax of using the call dispatch unit. The call dispatch unit 5 receives this call and takes the relevant steps to execute the addressed public function. For this first with operation m2 the call dispatch function resolves the addressed functional component from the received function call.

Based on that the call dispatch unit checks with operation m3 the functional component table 10 to find a record matching to the functional component according to the target indication. Preferably this returns the memory location and the access rights for accessing the functional component. If the provided target indication cannot be found in the functional component table, an exception is returned (not shown).

The call dispatch function then checks with operation m4 the access rights, if the calling functional component 9.1 has the right to call public functions of functional component 9.2., indicated by the target indication.

If this is not the case, the operation ends with an exception (not shown). Otherwise the call dispatch function accesses with operation m5 the interface table of the called functional component 9.2, in order to investigate the address of the called public function. This operation may be omitted for each following call of the functional component 9.2, when the interface table is memorized during runtime for future use.

With operation m6 then the addressed public function of the functional component 9.2. according to the target indication is finally called, by using the retrieved arguments. Then the public function is carrying out its tasks with operation m7, and returns a result value with operation m8 to the call dispatch unit 5. The call may look like that:

rstat=UTIL.copyRamToRam(para1, para2);

The call dispatch unit then continues with operation m9.

The results of the operation is then returned to the caller with operation m10. This example shows that the firmware architecture which is designed for easing a firmware updates, also allows an efficient way of collaboration between the functional components of the firmware. Moreover with the access rights security measures are foreseen which increase the security and integrity of the firmware, which is in particular important in the field of devices like UICCs which are supposed to be tamper resistant.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the embodiments of the invention. In addition, it is to be understood that the location or arrangement of individual elements within each disclosed embodiment may be modified without departing from the teaching of the invention.

Reference numbers:

| | |
|---|---|
| 1 | Device |
| 2 | Memory unit |
| 3 | Firmware |
| 4 | Firmware amending software |
| 5 | Call dispatch unit |
| 6 | functional component storage |
| 7 | data section |
| 8.x | function call |
| 9.x | functional component |
| 10 | functional component table |
| 11.x | public function |
| 12.x | functional component record |
| 13.x | interface table |
| 14 | memory location |
| 15 | processing circuitry |
| 16 | volatile memory |
| 17 | access rights |

The invention claimed is:

1. Method for amending firmware of a device, the device comprises a memory unit and a firmware amending software, and the firmware comprises:
at least two functional components, wherein the first functional component comprises at least one public function, configured to be called by at least one second functional component different from the first functional component, and
a call dispatch unit, where each call addressing one of the public functions is dispatched,
wherein the device further comprises, in the memory unit, a functional component table, wherein (i) least one of the functional components is registered, (ii) the functional component table comprises a set of access rights governing access to said at least one public function, and (iii) the firmware amendment comprises the steps for the firmware amending software of:
storing a new functional component at a memory location of the memory unit,
updating the functional component table with the memory location of said new functional component, and
handing over control to the firmware,
wherein a call of the at least one public function of the first functional component comprises for the second functional component executing a call of the call dispatch unit,
wherein the call to the call dispatch unit includes a target indication relative to the first functional component and the public function to be called,
wherein the calling of the at least one public function comprises for the call dispatch unit the step of calling the public function indicated by the target indication by retrieving the memory location of the first functional component from the functional component table, and
wherein the calling of the at least one public function comprises for the call dispatch unit the step of checking the set of access rights for the second functional component before calling the indicated public function of the first functional component.

2. Method according to claim 1,
wherein the firmware amendment comprises replacing functional components, comprising the steps of substituting one of the functional components with new functional component by replacing the registration of the substituted functional component in the functional component table.

3. Method according to claim 1,
wherein the first functional component comprises an interface table listing the at least one public function, and
wherein the calling of the at least one public function comprises for the call dispatch unit the step of calling the public function indicated in the target indication provided it is listed in the interface table.

4. Method according to claim 1,
wherein at least one functional component comprises an initialization function for preparing execution of the at least one public function of the functional component, wherein upon execution of the firmware the initialization function of the functional component is called.

5. Method according to claim 4,
wherein the initialization function comprises at least one out of the steps of
allocating of memory for the respective functional component, instructing the call dispatch unit about a firmware amendment concerning at least one out of a public function and/or access rights to said public function after carrying out said firmware amendment.

6. Method according to claim 5,
wherein the firmware amendment comprises replacing functional components, comprising the steps of substituting one of the functional components with new functional component by replacing the registration of the substituted functional component in the functional component table, and
wherein the initialization function comprises the step of migrating permanent data of the substituted functional component to the called functional component.

7. Method according to claim 1,
wherein the device is an integrated chip card.

8. A device comprising:
processing circuitry,
a memory unit storing at least a firmware, and a firmware amending software, wherein the firmware comprises:
 at least two functional components, wherein the first functional component comprises at least one public function, configured to be called by at least one second functional component different from the first functional component, and
 a call dispatch unit, where each call addressing one of the public functions is dispatched,
wherein the device further comprises, stored in the memory unit, a functional component table, wherein at least one of the functional components is registered,
wherein for amending the firmware the firmware amending software is configured to:
 store a new functional component at a memory location of the memory unit,
 update the functional component table with the memory location of said new functional component, and
 hand over control to the firmware,
wherein the firmware is further configured for calling at least one public function of the first functional component to execute a call of the call dispatch unit,
wherein the call to the call dispatch unit includes a target indication relative to the first functional component and the public function to be called, and
the call dispatch unit is configured to call the public function indicated by the target indication by retrieving the memory location of the first functional component from the functional component table,
the functional component table further comprising a set of access rights governing access to said at least one public function, and
wherein the call dispatch unit is configured to check the set of access rights for the second functional component before calling the indicated public function of the first functional component.

9. Device according to claim 8,
wherein the firmware amending software is further configured to replace functional components, comprising to substitute one of the functional components with a new functional component by replacing the registration of the substituted functional component in the functional component table.

10. Device according to claim 8,
wherein the first functional component comprises an interface table listing the at least one public function, and
wherein the call dispatch unit is configured to call the public function indicated in the target indication provided it is listed in the interface table.

11. Device according to claim 8,
wherein at least one functional component comprises an initialization function for preparing execution of the at least one public function of the functional component,
wherein the firmware is upon its execution configured to call the initialization function of the functional component.

12. Device according to claim 8, wherein the device is an integrated chip card.

* * * * *